United States Patent [19] [11] 4,360,049
Imai [45] Nov. 23, 1982

[54] RADIAL TIRES HAVING IMPROVED IRREGULAR WEAR RESISTANCE

[75] Inventor: Isamu Imai, Kodaira, Japan

[73] Assignee: Bridgestone Tire Company Limited, Tokyo, Japan

[21] Appl. No.: 240,671

[22] Filed: Mar. 5, 1981

[30] Foreign Application Priority Data

Mar. 10, 1980 [JP] Japan .................. 55-29898

[51] Int. Cl.³ .................. B60C 3/00; B60C 9/18
[52] U.S. Cl. .................. 152/209 R; 152/352 R; 152/361 R; 152/374
[58] Field of Search ........ 152/209 R, 352 R, 353 R, 152/354 R, 357 R, 361 R, 357 A, 374

[56] References Cited

U.S. PATENT DOCUMENTS

| | | | |
|---|---|---|---|
| 4,037,637 | 7/1977 | Arimura et al. | 152/352 |
| 4,120,337 | 10/1978 | Soma et al. | 152/352 R |
| 4,215,734 | 8/1980 | Suzuki et al. | 152/209 WT |
| 4,258,691 | 3/1981 | Nakayama | 152/209 R |
| 4,261,403 | 4/1981 | Imai et al. | 152/209 R |

Primary Examiner—Edward C. Kimlin
Assistant Examiner—Lois E. Boland
Attorney, Agent, or Firm—Sughrue, Mion, Zinn, Macpeak & Seas

[57] ABSTRACT

Radial tires having improved irregular wear resistance, which are reinforced with a belt cord layer and a carcass cord layer, are disclosed. These radial tires have a crown radius of not less than a certain limited value and use, for at least the ground contact area of the tread, a rubber composition consisting essentially of 100 parts by weight of styrene-butadiene copolymer rubber having a viscosity average molecular weight of not less than $2 \times 10^5$ or a blend rubber consisting of not less than 30 parts by weight of said copolymer rubber and at least one of natural rubber, polyisoprene rubber and polybutadiene rubber, 5–60 parts by weight of at least one of a liquid styrene-butadiene copolymer, a liquid polyisoprene and a liquid polybutadiene having a viscosity average molecular weight of $2 \times 10^3 - 1.5 \times 10^5$, and 40–90 parts by weight of carbon black.

11 Claims, 2 Drawing Figures

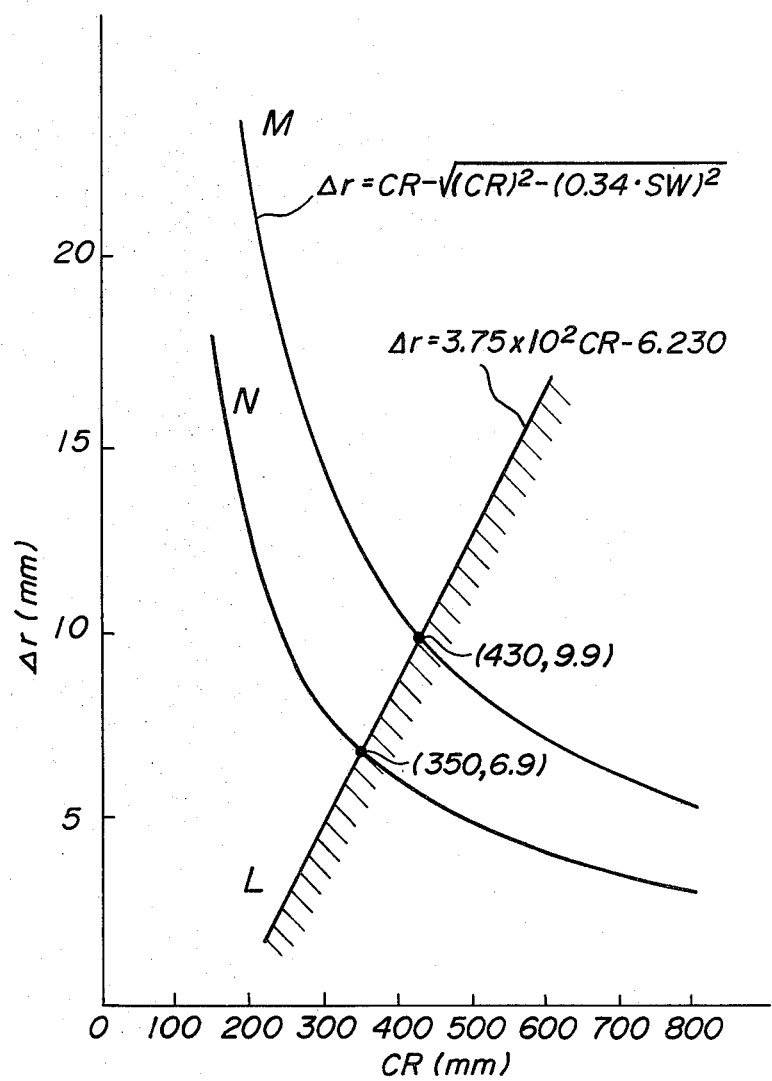

RADIAL TIRES HAVING IMPROVED IRREGULAR WEAR RESISTANCE

BACKGROUND OF THE INVENTION

1. Field of the Invention

The present invention relates to tires for truck.bus or tires for light truck. In particular, it relates to radial tires having highly improved irregular wear resistance and durability.

2. Description of the Prior Art

In general, it has been known that a tread rubber composed of styrene-butadiene copolymer rubber (SBR) is excellent in the wear resistance and irregular wear resistance under severe conditions, such as at high temperature or upon high slip, than a tread rubber composed of natural rubber. Also the former tread rubber is higher in wet skid resistance, so that this tread rubber has been broadly used for tires for passenger cars.

On the other hand, for tires for truck.bus (TB tire) or tires for light truck (LT tire), since they are thick in tread thickness, the tread rubber of natural rubber has been generally used in view of the heat generation. Recently, the radial structure having excellent moving ability and durability has been popularly used in view of safety and economy. However, the irregular wear phenomena, which has never been a problem in the tire of the conventional bias structure, have become a great problem. Particularly, when the irregular wear phenomena occurs, the wear life (primary life, wear life until the tire is reclaimed) of tires becomes very short and the vibrating ride feeling is adversely affected. Therefore, heretofore, in order to improve the irregular wear phenomena, changes in the tread pattern and in the structure for improving the uniformity of ground contact pressure at the ground contact area of the tread have been made, but the improvement has never been heretofore fully satisfied.

Accordingly, it has been considered that the tread rubber consisting mainly of SBR which has been heretofore mainly used for tires of passenger cars, is used for TB tire or LT tire, but when such tread rubber is applied to TB tire or LT tire, for example, such tread rubber is generally high in the self heat generation against the external dynamic stimulation. This is due to the fundamental property of SBR and the vulcanized rubber is liable to generate high heat, and when the tread rubber composed of SBR is used for TB tire having a large thickness of tread, a hindrance such as separation due to heat generation is caused. Furthermore, in the unvulcanized state, scorching is apt to be caused and the operability in production is very poor, so that a large amount of process oil is generally mixed in practice. However, when a tread rubber consisting mainly of SBR in which a large amount of process oil is mixed, is used, the process oil transfers into the belt portion or carcass portion of the tire during running or storage to reduce the modulus of rubber at the belt end portion of the tire or to promote the lowering of the adhesive force between the cord and the rubber. Hence, the safety and the durable life are considerably damaged, so that there are yet a large number of problems to be solved in the use of SBR for TB or LT tire treads.

The inventor has already disclosed in U.S. Patent Application Ser. No. 076,536, now U.S. Pat. No. 4,261,403 that SBR mixed with a liquid polymer having a low molecular weight, which is considered to be capable of crosslinking as a three-dimensional effective network upon vulcanizing, can be used for the tread of TB tire or LT tire. A radial tire having excellent durable life and improved irregular wear resistance can therefore be obtained. The inventor has further variously investigated in order to improve the irregular wear resistance of radial tire.

The irregular wear phenomenon of radial tire can be classified into two kinds. One is so-called shoulder stepdown wear phenomenon, wherein whole ribs in the shoulder portion of a tire or ribs in the outer side portion of the shoulder portion of a tire are worn extraordinarily faster than ribs in the center portion of the tire. The other is so-called railway wear phenomenon, wherein the edge of ribs in the center portion of a tire is worn extraordinarily fast. The inventor has found out that these irregular wear phenomena are highly influenced by the crown radius CR, which is the radius of curvature of the ground contact surface of the tread of a tire at the cross-section containing the rotation axis of the tire. That is, when CR is large, shoulder stepdown wear is small, but railway wear is large. Conversely, when CR is small, railway wear is small, but shoulder stepdown wear is very large.

Based on the above discovery, the inventor has further investigated the relationship between the shoulder stepdown wear or railway wear and the CR in a radial tire using a tread rubber consisting mainly of SBR and has found that a radial tire having a CR not less than a certain value is remarkably superior to conventional radial tires in both the shoulder stepdown wear resistance and railway wear resistance, and accomplished present invention.

SUMMARY OF THE INVENTION

The feature of the present invention is the provision of radial tires having improved irregular wear resistance, which are reinforced with a belt cord layer and a carcass cord layer, the improvement which comprises:

having a crown radius CR, i.e., a radius of curvature of the ground contact surface of the tread at the cross-section containing the rotation axis of the tire, which is given by the following formula;

$$CR \geq \sqrt{1.57(SW)^2 + 7{,}153} + 81.0$$

wherein SW represents the tire width under no load and standard inflation pressures defined by The Tire and Rim Association, Inc.; and using, for at least the ground contact area of the tread, a rubber composition consisting essentially of 100 parts by weight of a styrene-butadiene copolymer rubber having a viscosity average molecular weight of not less than $2 \times 10^5$ or a blend rubber consisting of not less than 30 parts by weight of said copolymer rubber and at least one of natural rubber, polyisoprene rubber and polybutadiene rubber, 5-60 parts by weight of at least one of a liquid styrene-butadiene copolymer, a liquid polyisoprene and a liquid polybutadiene having a viscosity average molecular weight of $2 \times 10^3 - 1.5 \times 10^5$, and 40-90 parts by weight of carbon black.

BRIEF DESCRIPTION OF THE DRAWINGS

FIG. 2 is a graph illustrating the relation between the crown radius (CR) and the radius difference ($\Delta r$), which will be defined in this specification.

DESCRIPTION OF THE PREFERRED EMBODIMENT

Figure 1:
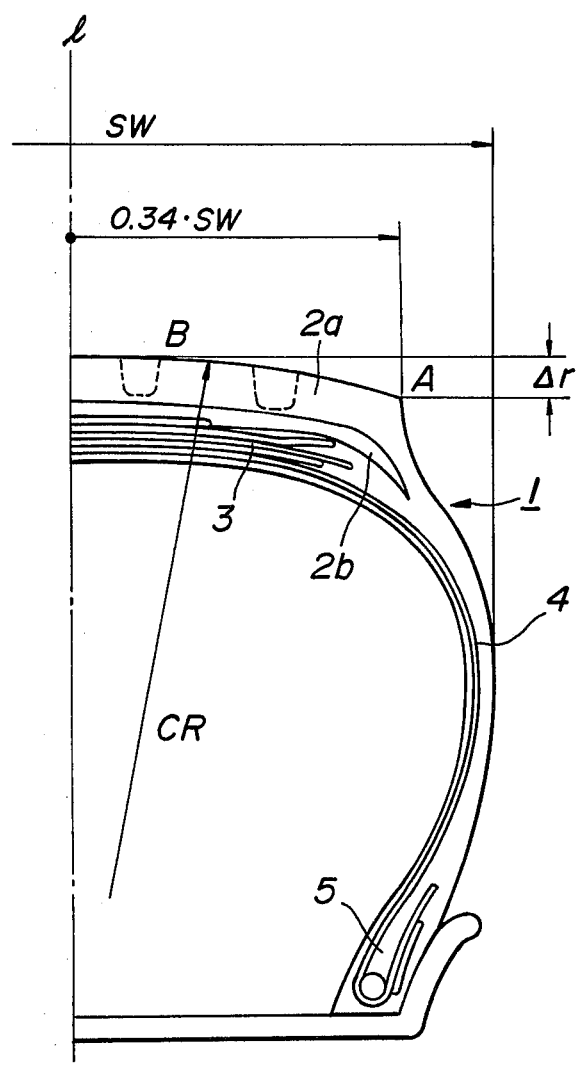
FIG. 1 is a cross-sectional view of the right half of a radial tire according to the present invention.

In the present invention, the crown radius CR is limited to the value represented by the following formula;

$$CR \geqq \sqrt{1.57(SW)^2 + 7,153} + 81.0$$

where inflation pressures are defined by The Tire and Rim Association, Inc. and under no load, based on the following reasons.

As illustrated in the following examples, when 8 kinds of tires are produced by changing the value of CR within the ranges of 300–690 mm and 260–480 mm with respective to a tire having a size of 1000 R20 (tire width: 271 mm) and a tire having a size of 750 R16 (tire width: 206 mm) respectively, which tires use in their tread a rubber consisting mainly of SBR and containing liquid styrene-butadiene copolymer, and the wear resistance test of these tires are carried out, it has been found that these tires have remarkably improved shoulder down-step wear resistance and railway wear resistance in the case where the tire having a size of 1000 R20 has a CR of at least 430 mm and the tire having a size of 750 R16 has a CR of at least 350 mm.

The above described relation between CR and SW will be explained in more detail referring to FIGS. 1 and 2. In an inflated fresh tire having a certain CR value prior to wear, the radius difference $\Delta r$ between the point A and the ground contact surface B of the tread is generally represented by the following formula;

$$\Delta r = CR - \sqrt{(CR)^2 - (0.34 \times SW)^2} \tag{1}$$

where point A (FIG. 1) is positioned at the outside of the rotation axis of the tire and is spaced by a distance of 34% based on the tire width SW from the center line of the tire. Therefore, when 271 mm is substituted for SW in the above formula in the case of the 1000 R20 tire, or when 206 mm is substituted for SW in the case of the 750 R16 tire, the curves M and N shown in FIG. 2 are obtained. It can be shown by these curves M and N that, when CR of the 1000 R20 tire is 430 mm, $\Delta r$ is 9.9 mm; and when CR of the 750 R16 tire is 350 mm, $\Delta r$ is 6.6 mm, and a straight line L connecting these two points is expressed by the following formula;

$$\Delta r = 3.75 \times 10^{-2} CR - 6.230 \tag{2}$$

Accordingly, the range of the crown radius CR in the present invention is the area shown by the slant lines in FIG. 2, and the following relationship:

$$\Delta R \geqq \sqrt{1.57(SW)^2 + 7,163} + 81.0 \tag{3}$$

can be obtained from the above described formulae (1) and (2).

In the present invention, in the area of at least the ground contact area of the tread, use is made of styrene-butadiene copolymer rubber having a viscosity average molecular weight of not less than $2 \times 10^5$ but if necessary, less than 70 parts by weight, preferably less than 50 parts by weight, particularly preferably less than 25 parts by weight, of at least one of natural rubber, polyisoprene rubber and polybutadiene rubber may be blended among 100 parts by weight of the rubber.

In the present invention, the liquid polymers to be used in the ground contact area of the tread are liquid styrene-butadiene copolymer, liquid polybutadiene or liquid polyisoprene having a viscosity average molecular weight of $2 \times 10^3 - 1.5 \times 10^5$, preferably liquid styrene-butadiene copolymer or liquid polybutadiene, more particularly the liquid styrene-butadiene copolymer having the same structure. When the molecular weight is less than $2 \times 10^3$, the amount of the liquid polymer which is not cross-linked by vulcanization, becomes larger and the polymer transfers in the rubber and the physical properties, particularly the heat generating property and the wear resistance of the vulcanized rubber lower. Hence, such liquid polymers are not preferable, and when the molecular weight is more than $1.5 \times 10^5$, the heat generation under the unvulcanized state is high, the scorching phenomenon is apt to occur, and therefore such liquid polymers are not preferable. When CR is large, the tire is apt to generate heat. As the liquid polymer, ones having higher molecular weight are more preferable. While, when the operability is taken into consideration, liquid polymers having a lower molecular weight are more preferable. Therefore, liquid polymers having a viscosity average molecular weight of higher than $7 \times 10^4$ and not higher than $1.3 \times 10^5$ are advantageously used. The amount of the liquid polymer compounded is 5–60 parts by weight, preferably 5–30 parts by weight based on 100 parts by weight of the rubber. If the amount is less than 5 parts by weight, there is substantially no effect for preventing the heat generation under the unvulcanized state. When the amount is more than 60 parts by weight, compounding ingredients, such as carbon black are not sufficiently dispersed due to the roller sticking and the insufficient shearing of a Banbury mixer upon mixing.

In the present invention, the amount of carbon black compounded in the rubber composition to be used in the ground contact area of the tread is 40–90 parts by weight based on 100 parts by weight of the rubber component. When the amount is less than 40 parts by weight, the wear resistance lowers. When the amount is more than 90 parts by weight, the operability lowers and there is problem in heat generation under the unvulcanized state and the vulcanized state. Carbon blacks having an IA (iodine adsorption value) of 83–150 mg/g and a DBP (dibutyl phthalate absorption value) of 80–120 ml/100 g provides more preferable results as the carbon black.

In the present invention, the embedding rubber of the belt cord layer is preferred to be natural rubber or polyisoprene rubber in view of the heat generation and the adhesion to the cords. But depending upon the liquid polymer to be used for the ground contact area of the tread, natural rubber or polyisoprene rubber may be mixed with polybutadiene rubber or styrene-butadiene copolymer rubber. However, the mixed amount is less than 30 parts by weight among 100 parts by weight of the rubber considering the above described heat generation.

If a base rubber is arranged between the ground contact area of the tread and the belt cord layer, the resistance of the tread against heat generation is improved, and further the transferring of the liquid polymer into the embedding rubber of the belt cord layer can be completely prevented. As the base rubber to be used in this case, natural rubber or polyisoprene rubber is used for preventing the heat generation after vulcanization and the transferring of the liquid polymer into the belt portion. Depending upon the kind of the liquid polymer to be used for the ground contact area of the tread, less than 30 parts by weight based on 100 parts by weight of the rubber of styrene-butadiene copolymer rubber or polybutadiene rubber may be mixed. When the styrene-butadiene copolymer rubber becomes not less than 30 parts by weight, the above described heat generating property degrades and when the polybutadiene rubber becomes not less than 30 parts by weight, the dispersability of carbon black becomes poor.

In the present invention, the amount of carbon black to be compounded in the base rubber is 20–50 parts by weight based on 100 parts by weight of the rubber. When the amount is less than 20 parts by weight, the wear resistance and the cut resistance are poor, so that a problem occurs in running in the state where the base rubber is exposed to the ground contact surface at the wear end period of tire and when the amount is more than 50 parts by weight, the heat generating property which is most important for the base rubber, becomes worse, so that such amounts are not preferable. When the carbon black is one having an IA of 83–110 mg/g and a DBP of 80–115 ml/100 g, the more preferable results can be obtained.

In the present invention, not more than 10 parts by weight of process oil, which is used in the general rubber industry, may be compounded in the base rubber in order to improve the operability under unvulcanized state.

In the present invention, the base rubber can be either arranged to cover whole of the belt cord layer or the central portion thereof, or arranged only on the shoulder portion of tire. The thickness of the base rubber is preferred to be less than $\frac{1}{2}$ of the thickness of the tread.

The cords used for the belt layer and the carcass layer in the present invention include organic fiber cords, such as nylon fiber cords, polyester fiber cords, aromatic polyamide fiber cords, steel cords or glass cords.

The following examples are given for the purpose of illustration of this invention and are not intended as limitations thereof.

EXAMPLE 1

To 100 parts by weight of SBR 1500 were added 43 parts by weight of various liquid styrene-butadiene copolymers having a viscosity average molecular weight of $1 \times 10^4 - 1.5 \times 10^5$, 71 parts by weight of ISAF carbon black, 1.4 parts by weight of N-phenyl-N'-isporopyl-p-phenylenediamine, 1.4 parts by weight of stearic acid, 4.3 parts by weight of zinc oxide, 1.7 parts by weight of N-cyclohexyl-2-benzothiazolsulfenamide, 0.9 parts by weight of diphenylguanidine and 1.9 parts by weight of sulfur to prepare various rubber compositions. The temperature due to heat generation in the rubber compositions by means of a plastometer was measured to evaluate the scorching resistance of the rubber composition. Then, the rubber composition was vulcanized at 145° C. for 45 minutes, and the resilience of the vulcanizate was measured according to JIS K6301. In the evaluation of scorching resistance, a rubber composition was kneaded at an initial temperature of 70° C. at a revolution rate of 100 rpm for 15 minutes by means of a plastometer made by Brabender Co. in West Germany, and the temperature of the rubber composition was measured, and the scorching resistance of the rubber composition was indicated by the marks o, Δ and x. In this case, the adhesion of the rubber composition to the rotor was estimated at the same time, and the adhesion was indicated by the marks o, Δ and x. The results obtained are shown in the following Table 1.

TABLE 1

| Rubber composition No. | 1 | 2 | 3 | 4 |
|---|---|---|---|---|
| Viscosity average molecular weight of liquid styrene-butadiene copolymer | $1 \times 10^4$ | $8 \times 10^4$ | $1 \times 10^5$ | $1.5 \times 10^5$ |
| Resilience, % | 38 | 44 | 45 | 49 |
| Adhesion | Δ | o | o | o |
| Scorching resistance | o | o | o | Δ |

TB radial tire Nos. 1–7 (CR: 300–620 mm) having a tire size of 1000 R20 and having a four groove pattern were produced, wherein the above described rubber composition Nos. 1–4 were used in the ground contact area of the tread, a rubber composition shown in the following Table 2 was used as a tread base rubber (thickness: 3 mm) and a steel cord layer having a structure of $1 \times 3 + 6$ was embedded in an embedding rubber shown in the following Table 3 and was used as a belt cord layer. With respect to these tires, a drum test for the durability against heat generation, a road test for the wear resistance (shoulder downstep wear resistance, railway wear resistance and average wear resistance) and a road test for the durability of belt were carried out.

Further, a TB radial tire No. 8 (CR: 490 mm) having a tread portion of unitary structure was produced, in which the rubber composition No. 4 in Table 1 was used in the tread. For comparison, TB radial tire Nos. 9–12 (CR: 300–620 mm) having a tread portion of unitary structure were produced, in which the rubber composition shown in the following Table 4 was used in the tread. The tires were subjected to the same tests as described above.

The results obtained are shown in the following Table 5.

The test methods are as follows.

Drum test for durability against heat generation:

A tire was run on a drum having a diameter of 170 cm and a smooth surface at a speed of 60 km/hr until the tire was broken by increasing 500 kg of load every 1,000 km running under a JIS normal load, and the running distance of the tire until the breakage was measured.

Road test for wear resistance:

A tire was run over a distance of 70,000 km on a road comprising 70% of highway and 30% of ordinary way. With respect to the tire after the running, the shoulder downstep wear of irregular wear was shown by the amount of the shoulder downstep wear, and the railway wear of irregular wear was shown by the total sum of the railway wear width in all ribs. Further, the depth of the remaining grooves in the areas, wherein irregular wear was not yet caused, was measured, and the running distance per 1 mm wear was calculated and indicated as the average wear resistance.

Road test for durability of belt:

After the road test for irregular wear resistance, a tire was cut at three portions on the periphery of the tire along the plane containing its rotation axis to prepare test samples, and the occurrence of cracks at the belt cord end was observed by naked eye.

TABLE 2

|  | (Parts by weight) |
|---|---|
| Natural rubber | 100 |
| HAF carbon black | 30 |
| Stearic acid | 2 |
| N—phenyl-N'—isopropyl-p-phenylenediamine | 1 |
| Zinc oxide | 6 |
| N—oxydiethylene-2-benzothiazolsulfenamide | 0.8 |
| sulfur | 4 |

TABLE 3

|  | (Parts by weight) |
|---|---|
| Natural rubber | 90 |
| SBR 1500 | 10 |
| HAF carbon black | 50 |
| Aromatic oil | 2 |
| Cobalt stearate | 4 |
| N—phenyl-N'—isopropyl-p-phenylenediamine | 0.5 |
| Zinc oxide | 10 |
| Dibenzothiazyl disulfide | 1 |
| Sulfur | 5 |

TABLE 5

|  | (Parts by weight) |
|---|---|
| Natural rubber | 100 |
| ISAF carbon black | 50 |
| Aromatic oil | 10 |
| N—phenyl-N'—isopropyl-p-phenylenediamine | 1 |
| Stearic acid | 2 |
| Zinc oxide | 4 |
| N—cyclohexyl-2-benzothiazolsulfenamide | 0.8 |
| Sulfur | 1.5 |

TABLE 5

| Tire No. | 1 | 2 | 3 | 4 | 5 | 6 |
|---|---|---|---|---|---|---|
| CR (mm) | 300 | 430 | 490 | 620 | 490 | 490 |
| SW (mm) | 272 | 272 | 272 | 272 | 272 | 272 |
| Rubber composition | TABLE 1 No. 3 | TABLE 1 No. 3 | TABLE 1 No. 3 | TABLE 1 No. 3 | TABLE 1 No. 1 | TABLE 1 No. 2 |
| Drum test for durability against heat generation (km) | 5,458 | 5,237 | 4,796 | 4,135 | 4,245 | 4,686 |
| Irregular wear Shoulder downstep wear (mm) | 5.4 | 3.1 | 2.1 | 1.2 | 2.3 | 2.2 |
| Railway wear (mm) | 7.1 | 8.6 | 9.0 | 10.3 | 7.1 | 8.7 |
| Average wear resistance (km) | 8,560 | 9,700 | 10,400 | 10,900 | 10,000 | 10,200 |
| Cracks at the belt end | none | none | none | none | slight | none |

| Tire No. | 7 | 8 | 9 | 10 | 11 | 12 |
|---|---|---|---|---|---|---|
| CR (mm) | 490 | 490 | 300 | 430 | 490 | 620 |
| SW (mm) | 272 | 272 | 272 | 272 | 272 | 272 |
| Rubber composition | TABLE 1 No. 4 | TABLE 1 No. 4 | TABLE 4 | TABLE 4 | TABLE 4 | TABLE 4 |
| Drum test for durability against heat generation (km) | 4,962 | 3,859 | 5,513 | 5,292 | 4,906 | 4,521 |
| Irregular wear Shoulder downstep wear (mm) | 1.9 | 1.9 | 5.5 | 3.4 | 2.2 | 1.3 |
| Railway wear (mm) | 10.0 | 10.5 | 9.9 | 33.0 | 41.0 | 49.0 |
| Average wear resistance (km) | 10,800 | 10,800 | 7,580 | 7,740 | 8,010 | 8,300 |
| Cracks at the belt end | none | none | occur | occur | occur | occur |

It can be seen from Table 5 that tire Nos. 2–8 according to the present invention have remarkably improved irregular wear resistance and belt durability as compared with the conventional tires. Particularly Nos. 2–7 are not substantially deteriorated in the durability against heat generation as compared with the conventional tires.

EXAMPLE 2

LT radial tire Nos. 13–16 (CR: 260–480 mm) having a tire size of 750 R16 and a four groove pattern were produced, in which rubber composition No. 3 in Table 1 was used in the ground contact area of the tread and the rubber composition shown in Table 2 was used as a base rubber. For comparison, LT radial tire Nos. 17–20 having a tread portion of unitary structure was produced, in which the rubber composition shown in Table 4 was used in the tread. These tires were tested in the same manner as described in Example 1. The results obtained are shown in the following Table 6.

TABLE 6

| Tire No. | 13 | 14 | 15 | 16 | 17 | 18 | 19 | 20 |
| --- | --- | --- | --- | --- | --- | --- | --- | --- |
| CR (mm) | 260 | 350 | 410 | 480 | 260 | 350 | 410 | 480 |
| SW (mm) | 208 | 208 | 208 | 208 | 208 | 208 | 208 | 208 |
| Rubber composition | TABLE 1 No. 3 | TABLE 1 No. 3 | TABLE 1 No. 3 | TABLE 1 No. 3 | TABLE 4 | TABLE 4 | TABLE 4 | TABLE 4 |
| Drum test for durability against heat generation (km) | 5,656 | 5,253 | 5,022 | 4,560 | 5,772 | 5,368 | 5,079 | 4,849 |
| Irregular wear — Shoulder downstep wear (mm) | 4.6 | 2.4 | 1.3 | 0.8 | 4.9 | 2.6 | 1.4 | 0.9 |
| Irregular wear — Railway wear (mm) | 2.0 | 2.5 | 2.9 | 3.0 | 3.2 | 8.8 | 11.5 | 15.6 |
| Average wear resistance (km) | 12,530 | 12,368 | 13,157 | 13,282 | 10,830 | 11,040 | 11,260 | 11,475 |
| Cracks at the belt end | none | none | none | none | occur | occur | occur | occur |

It can be seen from Table 6 that tire Nos. 13–16 according to the present invention have remarkably improved irregular wear resistance and belt durability without substantially deteriorating the durability against heat generation as compared with the conventional tires.

What is claimed is:

1. In a radial tire having improved irregular wear resistance, which are reinforced with a belt cord layer and a carcass cord layer, the improvement which comprises:

having a crown radius CR (in mm.), a radius of curvature of the ground contact surface of the tread at the cross-section containing the rotation axis of the tire, which is given by the following formula:

$$CR \geq \sqrt{1.57(SW)^2 + 7,153} + 81.0$$

wherein SW (in mm.) represents the tire width under no load and standard inflation pressures as defined by The Tire and Rim Association, Inc.; and using, for at least the ground contact area of the tread, a rubber composition consisting essentially of 100 parts by weight of a styrene-butadiene copolymer rubber having a viscosity average molecular weight of not less than $2 \times 10^5$ or a blend rubber consisting of not less than 30 parts by weight of said copolymer rubber and at least one of natural rubber, polyisoprene rubber and polybutadiene rubber, 5–60 parts by weight of at least one of a liquid styrene-butadiene copolymer, a liquid polyisoprene and a liquid polybutadiene having a viscosity average molecular weight of $2 \times 10^3 - 1.5 \times 10^5$, and 40–90 parts by weight of carbon black.

2. The radial tire according to claim 1, wherein a base rubber is arranged between the ground contact area of the tread and the belt cord layer.

3. The radial tire according to claim 1 or 2, wherein natural rubber, polyisoprene rubber or a blend rubber consisting of said rubber and less than 30 parts by weight of at least one of polybutadiene rubber and styrene-butadiene copolymer rubber is used as an embedding rubber for the belt cord layer.

4. The radial tire according to claim 1 or 2, wherein said liquid polymer has a viscosity average molecular weight of higher than $7 \times 10^4$ and not higher than $1.3 \times 10^5$.

5. The radial tire according to claim 1 or 2, wherein the amount of styrene-butadiene copolymer rubber in a blend rubber used for the ground contact area of the tread is not less than 50 parts by weight among 100 parts by weight of the blend rubber.

6. The radial tire according to claim 1 or 2, wherein the amount of styrene-butadiene copolymer rubber in a blend rubber used for the ground contact area of the tread is not less than 75 parts by weight among 100 parts by weight of the blend rubber.

7. The radial tire according to claim 1 or 2, wherein the amount of the liquid polymer used in the ground contact area of the tread is 5–30 parts by weight.

8. The radial tire according to claim 1 or 2, wherein the carbon black used for the ground contact area of the tread has an iodine adsorption value (IA) of 83–150 mg/g and a dibutyl phthalate absorption value (DBP) of 80–120 ml/100 g.

9. The radial tire according to claim 2, wherein the base rubber is a rubber composition consisting essentially of 100 parts by weight of natural rubber, polyisoprene rubber or a blend rubber consisting of these rubbers and less than 30 parts by weight of at least one of polybutadiene rubber and styrene-butadiene copolymer rubber, 20–50 parts by weight of carbon black and 0–10 parts by weight of a process oil.

10. The radial tire according to claim 2 or 9, wherein the base rubber has a thickness less than ½ of the thickness of the tread.

11. The radial tire according to claim 9, wherein the carbon black used for the base rubber has an IA of 83–110 mg/g and a DBP of 80–115 ml/100 g.

* * * * *